United States Patent [19]

Atalla

[11] 4,268,715
[45] May 19, 1981

[54] METHOD AND APPARATUS FOR SECURING DATA TRANSMISSIONS

[75] Inventor: Martin M. Atalla, Menlo Park, Calif.

[73] Assignee: Atalla Technovations, Sunnyvale, Calif.

[21] Appl. No.: 3,898

[22] Filed: Jan. 16, 1979

Related U.S. Application Data

[63] Continuation-in-part of Ser. No. 902,444, May 3, 1978.

[51] Int. Cl.³ .............................................. H04L 9/00
[52] U.S. Cl. ..................................... 178/22; 235/379; 235/380; 340/149 R
[58] Field of Search ............................ 178/22; 375/2; 340/149 R, 149 A; 235/379, 380, 381

[56] References Cited

U.S. PATENT DOCUMENTS

| | | | |
|---|---|---|---|
| 3,654,604 | 4/1972 | Crafton | 340/149 R |
| 3,938,091 | 2/1976 | Atalla et al. | 340/152 R |
| 3,956,615 | 2/1976 | Anderson | 340/149 A |
| 3,985,998 | 10/1976 | Crafton | 340/149 A |
| 4,004,089 | 1/1977 | Richard et al. | 340/149 A |
| 4,025,760 | 5/1977 | Trenkamp | 340/149 A |
| 4,182,933 | 1/1980 | Rosenblum | 178/22 |
| 4,186,871 | 2/1980 | Anderson et al. | 340/149 A |

*Primary Examiner*—Howard A. Birmiel
*Attorney, Agent, or Firm*—A. C. Smith

[57] ABSTRACT

A method and apparatus are provided for improving the security of data transmissions between stations and for controlling secured transactions from remote locations in a data-transfer system. The method and apparatus obviate the need for transmitting user-identification information such as personal identification number (PIN) from station to station, e.g., from the station utilized by the user to enter his PIN and initiate a transaction, to the station that processes the transaction. Also, for added security, the method and apparatus provide for encryption (encoding) and decryption (decoding) of data during a transaction using encryption and decryption keys produced from different (independent) PINs. The apparatus includes at least one irreversible algorithm module, a random number generator and at least one data file (e.g., disc or magnetic tape storage). The apparatus also includes a comparator or, alternatively, an encoding algorithm module and a matching decoding algorithm module. In addition, a data-transfer system obviates the need for paired encryption/decryption modules on a data link while nevertheless maintaining a high level of security in the data transferred. This facilitates remote control of data transfers between locations within the system, enables use of conventional data links, and permits convenient changes of and additions to the files of stored codes for the system without compromising the security of data transfers or of identifying codes for authorized individuals.

28 Claims, 16 Drawing Figures

4,268,715

METHOD AND APPARATUS FOR SECURING DATA TRANSMISSIONS

CROSS-REFERENCE TO RELATED APPLICATION

This is a continuation-in-part application of pending application Ser. No. 902,444, pending entitled Method And Apparatus For Securing Data Transmissions, filed on May 3, 1978, by M. M. Atalla.

BACKGROUND OF THE INVENTION

Numerous methods and apparatus have been developed for transmitting messages in a secure manner between stations. Many of the methods and apparatus provide for coding of the message prior to transmission and for decoding of the message at its destination subsequent to transmission. Two such methods and apparatus are described, for example, in U.S. Pat. No. 3,711,645 issued Jan. 16, 1973 to Kurt Ehrat, entitled Method and Apparatus for Coding Messages, and in U.S. Pat. No. 3,956,615 issued May 11, 1976, to Thomas G. Anderson, William A. Boothroyd and Richard C. Frey, entitled Transaction Execution System with Secure Data Storage and Communications. A third method and apparatus is described, for example, in U.S. Pat. No. 3,938,091 issued Feb. 10, 1976, to Martin M. Atalla, entitled Personal Verification System.

A common feature of such apparatus is the use of fixed, predetermined encoding-decoding keys to encode and decode data, or the use of variable encoding keys transmitted with the encoded message to a destination station for processing (the variable encoding keys being supplied by the user, or generated by the apparatus from user-supplied information). At the destination station, the transmitted variable-key is utilized by a decoder of the apparatus to decode the encoded message.

Whereas the use of variable rather than fixed encoding-decoding keys would seem to provide a greater measure of security in message transmission than do fixed keys (especially variable keys supplied by a user or generated by the apparatus from user-supplied information), the practice of transmitting a variable key so that it can be used in the decoding process reduces the security of the operation because unauthorized users could conceivably gain access to the key during the transmission of the key. It would be desirable, therefore, in improving the security of such data transmission operations (especially bank transaction operations or the like which require not only secure transmission of data but also accurate identification of users) to use a technique which provides for secure transmission of data without requiring transmission of matching encoding-decoding keys or of user-identification information. Also, it would be desirable in certain applications to obviate the need for dedicated pairs of matched encoders/decoders in order to enhance the flexibility of the data-transfer system and to reduce the start-up and change-over time inherent in placing conventional paired modules in the proper locations.

SUMMARY OF THE INVENTION

In accordance with the illustrated preferred embodiment of the present invention, a method and apparatus are provided for improving security of data transmission between stations by making it unnecessary to transmit user-identification information between the stations. Also, to further improve security, an alternative method provides for encoding and decoding the data during each transaction, using encoding and decoding keys produced from different PINs (Personal Identification Number entered into the apparatus by a user to initiate a transaction such as a bank deposit or withdrawal transaction). The apparatus includes at least one irreversible algorithm module, a random number generator, and at least one data file. The composite system embodiment of the present invention enables encoded data to be transferred by conventional data transmission means such as mail, voice transmission via telephone, radio, and the like, without loss of security associated with the transmitted data or the identifying code of an authorized user. Also, the system embodiment of the present invention facilitates the remote control of data-transfer operations between distant stations and permits changes of and additions to central files of identifying codes for authorized individuals from remote stations without compromising the security of the transmission of such critical information.

DESCRIPTION OF THE PREFERRED EMBODIMENT

Figure 1A:
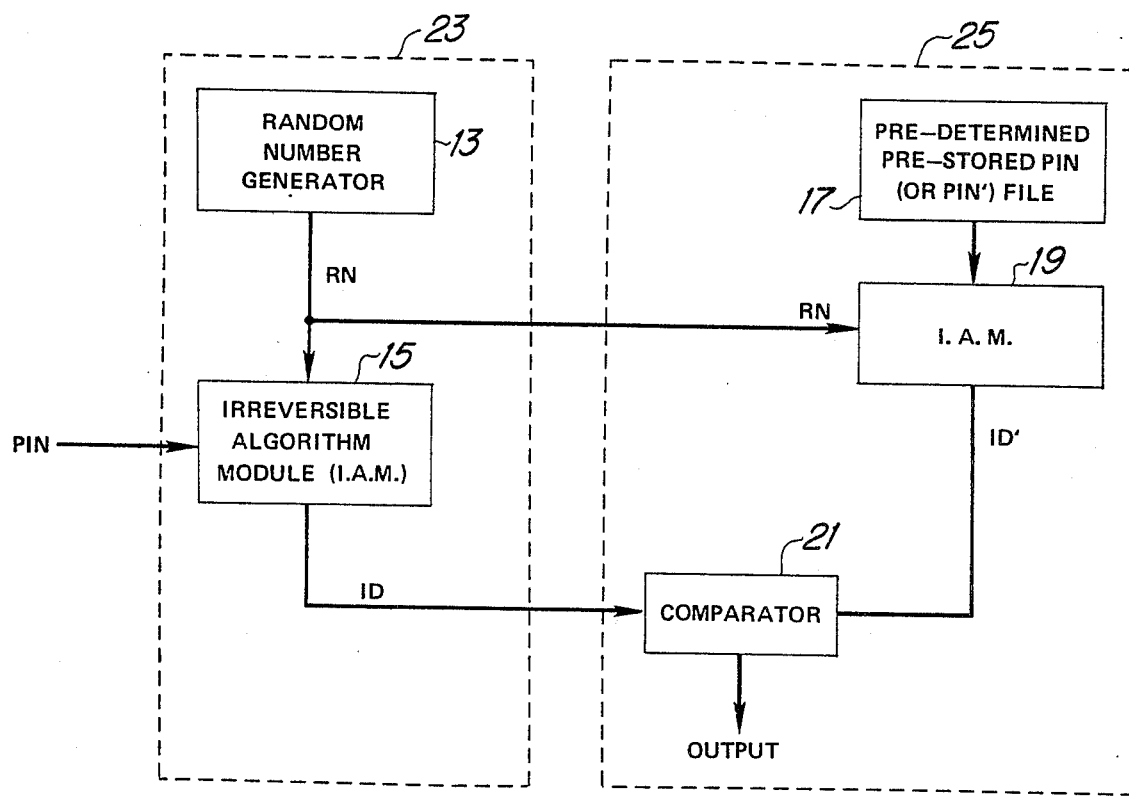
FIGS. 1A and 1B are block diagrams showing, respectively, the apparatus and method of the present invention.
Figure 1B:
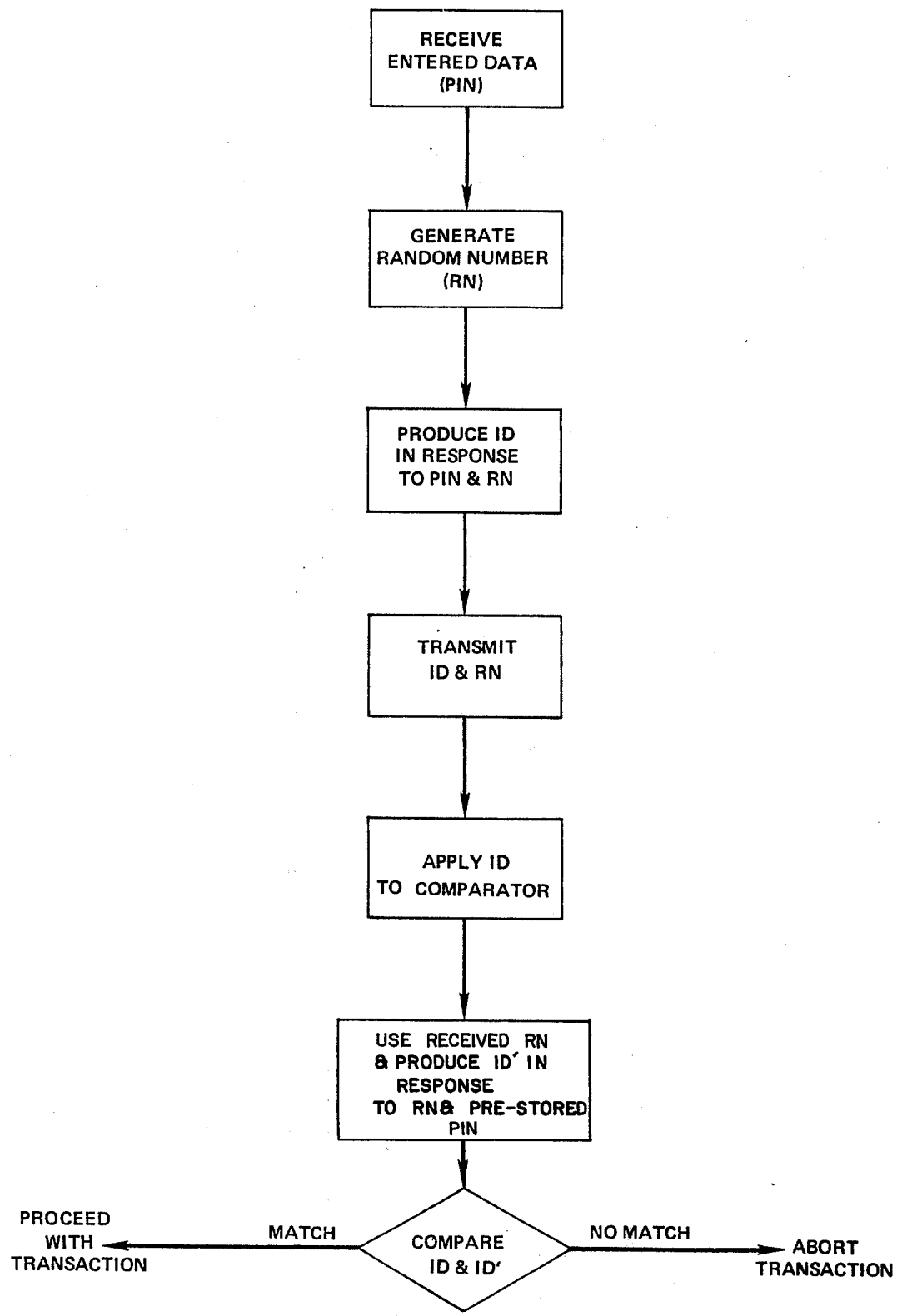

Referring now to FIGS. 1A and 1B, there are shown an apparatus and a method for improving the security of transmitted data between stations. The apparatus and method offer improved security by not requiring the transmission of PIN data from the originating or user station to the destination or processing station. The apparatus comprises at a transmitting location 23 a random number generator 13, and an irreversible algorithm module (I.A.M.) 15 (for example, of the type disclosed in U.S. Pat. No. 3,938,091 issued on Feb. 10, 1976, to M. M. Atalla and A. F. Liu), and further comprises a storage file 17, another irreversible alogrithm module 19, and a comparator 21 at a receiving location 25. In response to PIN data entered by a user and in response to a random number (RN) produced by random number generator 13, algorithm module 15 produces a user identifier code (ID) which may be transmitted and applied to comparator 21 at the receiving location. The RN produced by random number generator 13 is also transmitted to an I.A.M. 19 in the receiving station 25. A predetermined authentic PIN (prestored in a selected register of storage file 17) may be accessed and applied to algorithm module 19 along with the received RN to produce a new user identifier code (ID'). The algorithm module 19 encrypts or encodes the signals applied thereto in a manner which is identical to module 15. The previously produced user identifier code (ID) is then compared with the newly produced user identifier code (ID') by comparator 21. If a match occurs (i.e., if ID and ID' are found to be the same), an output data value is produced (or internal flag is set) indicating that the transaction (e.g., user withdrawal of money from a bank) should proceed. If no match occurs, comparator 21 produces an output value indicating that the transaction should not proceed.

From the above-described apparatus and method of FIGS. 1A and 1B, therefore, it is seen that no personal identification number of the user (PIN) is transmitted from the originating or user location 23 to the destination or receiving location 25.

Figure 2A:
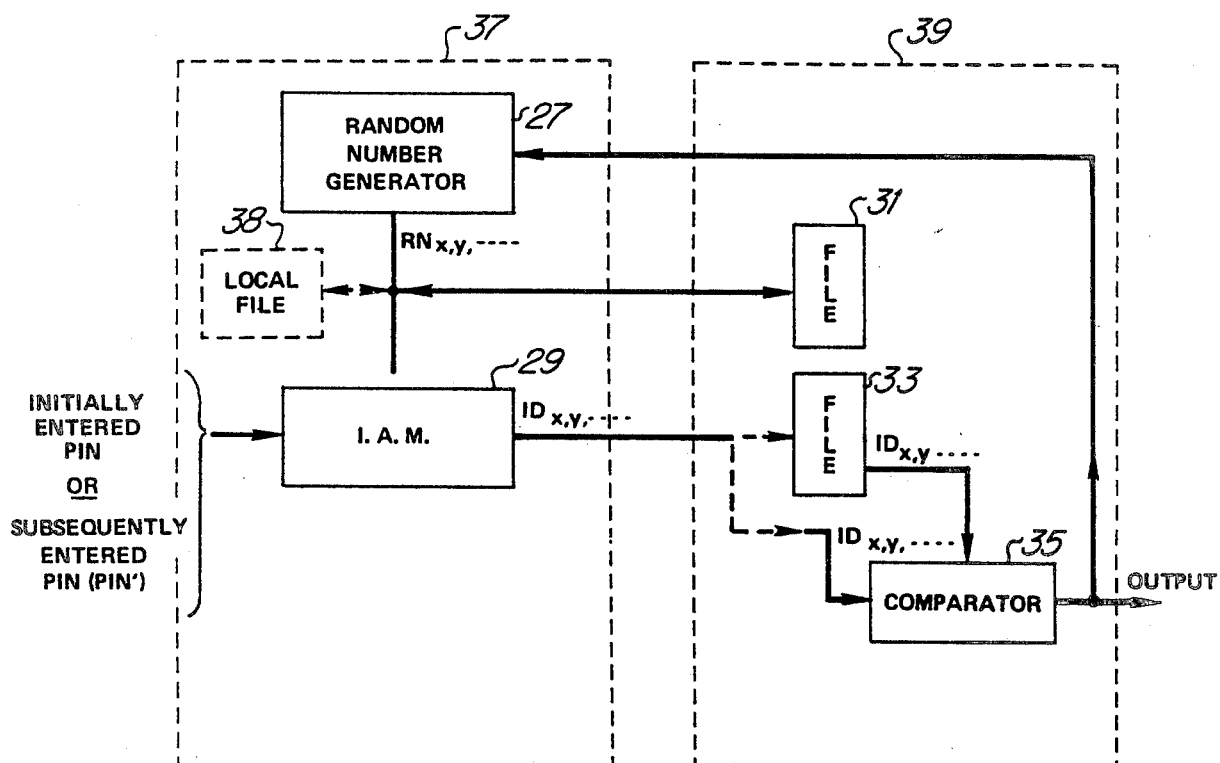
FIGS. 2A and 2B are block diagrams showing, respectively, alternative embodiments of the apparatus and method of the present invention.
Figure 2B:
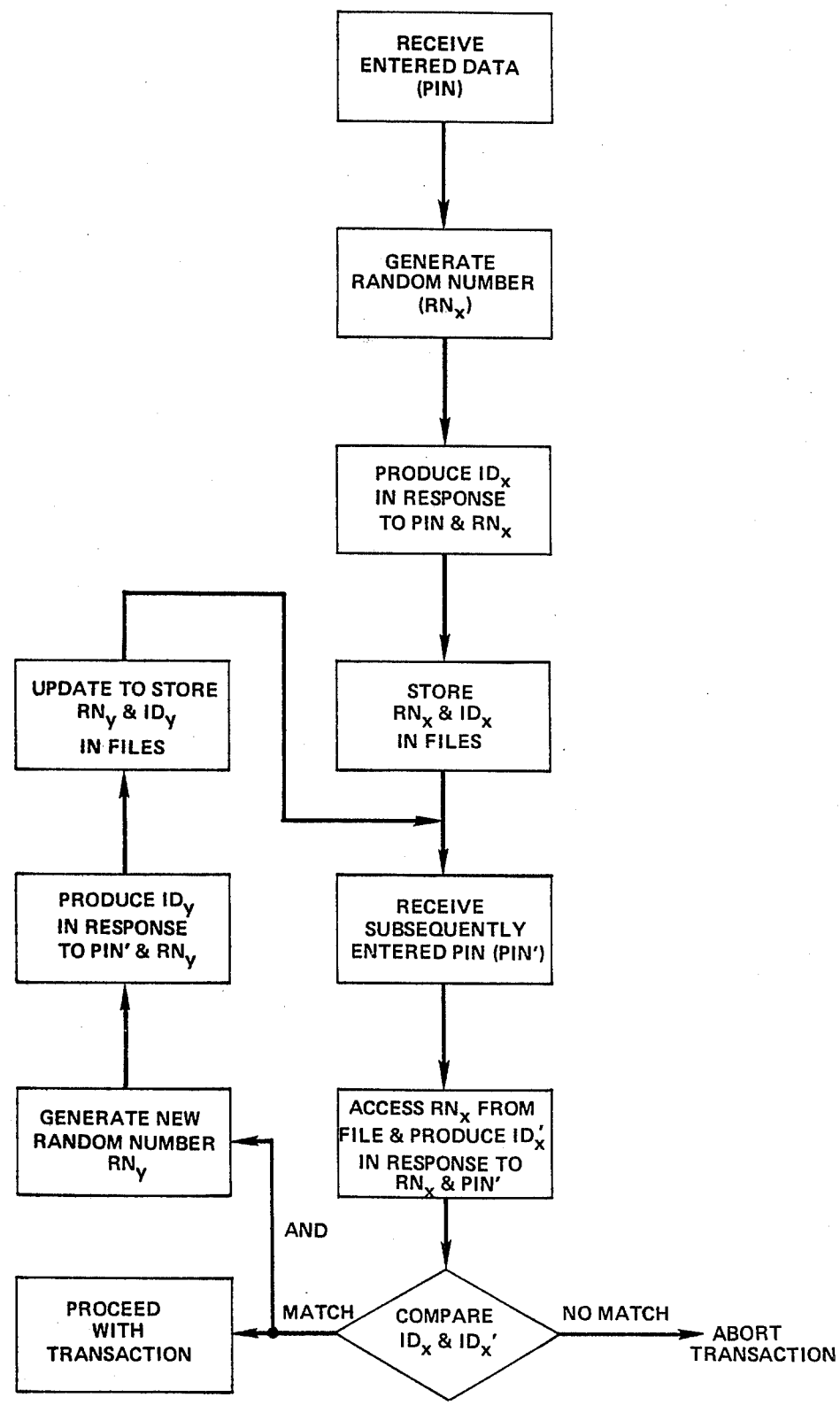

Another embodiment of the present invention is shown in FIGS. 2A and 2B. In this embodiment, the user identifier code (ID) is produced in response to RN and to entered PIN data in a manner similar to that shown in FIGS. 1A and 1B. However, only RN and ID are transmitted from user station 37 to file storage 31, 33 at processing station 39. In this embodiment, no PIN is transmitted between stations, nor is the PIN stored in the file 31, 33 where it may be susceptible to unauthorized access.

In this embodiment, the present apparatus operates, as shown in FIG. 2B, to update the identifier code ID and the random number RN in storage files each time a proper verification of user is established. Thus, a user's initial entry of a PIN is combined with an RN via an irreversible algorithm module of the type previously described to produce an ID which, with the associated RN, may be transmitted and stored in files 31, 33 at the receiver station 39 (and optionally at a local file 38).

Thereafter, the authorized user again enters his PIN (referred to herein as PIN'), and the RN is accessed from the file 31 (or optionally from the local file 38). The PIN' and the retrieved RN ($RN_x$ herein) are encrypted by the algorithm module 29 to produce the ID (which should be identical to the ID in file 33) for transmission to comparator 35 at the receiving station 39. There, the comparison is made with the ID retrieved from file 33. If the match is detected, the output from comparator 35 provides the indication that the present transaction may proceed, and also initiates the generation of a new random number $RN_y$. This new random number is encrypted by the algorithm module 29 along with the PIN' which was entered in the present transaction to yield the new $ID_y$. The new $RN_y$ and new $ID_y$ are then transmitted to files 31, 33 (and optionally to local file 38) to supplant $RN_x$ and $ID_x$ previously stored therein. In this manner, a user identifier code is dynamically stored and updated each time an authroized user is verified. More importantly, however, no PIN need be stored or transmitted in order to verify the authorized user.

Figure 3A:
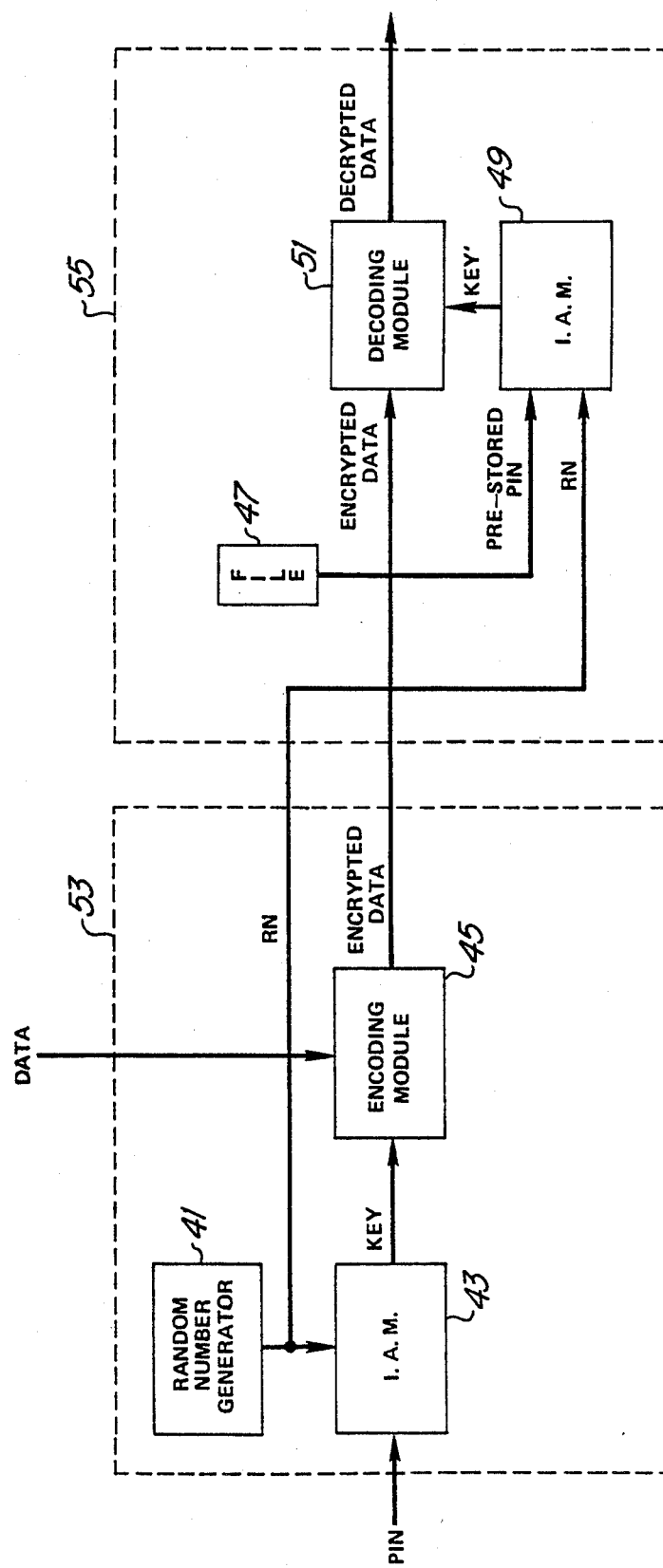
FIGS. 3A and 3B are block diagrams showing, respectively, other alternative embodiments of the apparatus and method of the present invention.
Figure 3B:
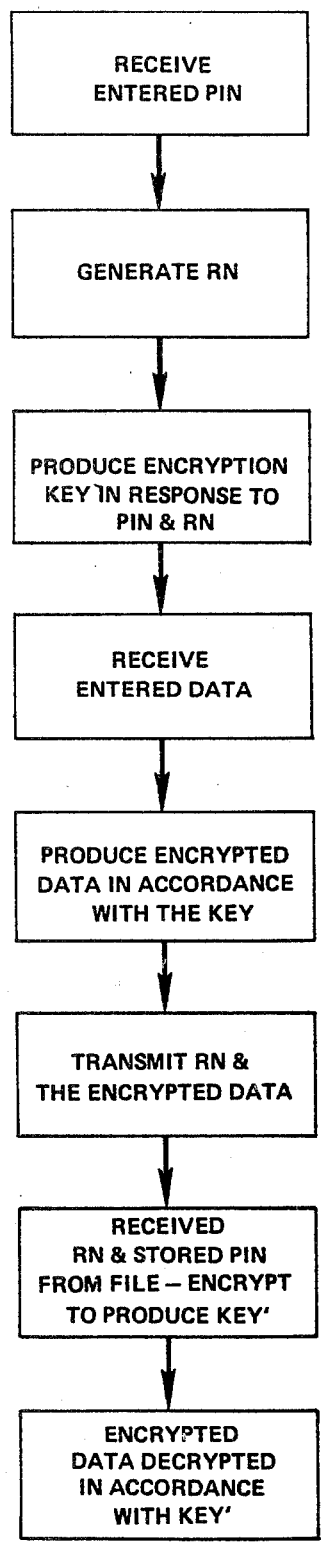

Referring now to the embodiment of the present invention, as illustrated in FIGS. 3A and 3B, a PIN in storage 47 is used with a random number RN to produce a KEY code by which data may be encrypted (encoded). However, the KEY code used to encrypt data is not transmitted. In response to a PIN entered by a user and a random number (RN) generated by a random number generator 41, irreversible algorithm module 43 of the type previously described produces an encryption key (KEY) which is applied to encoding algorithm module 45 (e.g., an encoder such as The Bureau of Standards Chip incorporating the National Bureau of Standards' encryption-decryption algorithm which is the Federal Information Processing Standard approved by the U.S. Department of Commerce). In response to applied data, encoding module 45 encodes the data in accordance with the encryption key (KEY). The encoded data, together with the associated random number (RN) is then transmitted from user station 53 to processing station 55. The random number (RN) thus received by station 55 and the prestored authentic PIN which is accessed from file 47 are applied to algorithm module 49 which produces an encryption key (KEY') that should be identical to the KEY, and this KEY' is applied to decoding module 51. Decoding module 51 operates in accordance with the same National Bureau of Standards encoding scheme as module 45 and produces the desired decrypted (decoded) data. It should be noted that as long as the entered PIN matches the prestored PIN, KEY will match KEY', and the decrypted data will match the entered data. This embodiment of the present invention thus obviates the need to transmit the generated KEY between stations and eliminates risk of disclosure of the KEY during such transmission. Also, it should be noted that in this embodiment, the KEY is determined and the PIN is verified simultaneously under the control of the user. That is, the encryption and decryption of data are solely under the control of the user by virtue of his own entered PIN. Also, the user who entered the PIN is verified in response to the encrypted data being received and decrypted at the receiver station 55 using the corresponding PIN that is retained in file 47. Further, the information which is transmitted between stations includes a random number which changes after each transaction and the encrypted data which also changes form after each transaction, even for the same data entered at station 53.

Figure 4A:
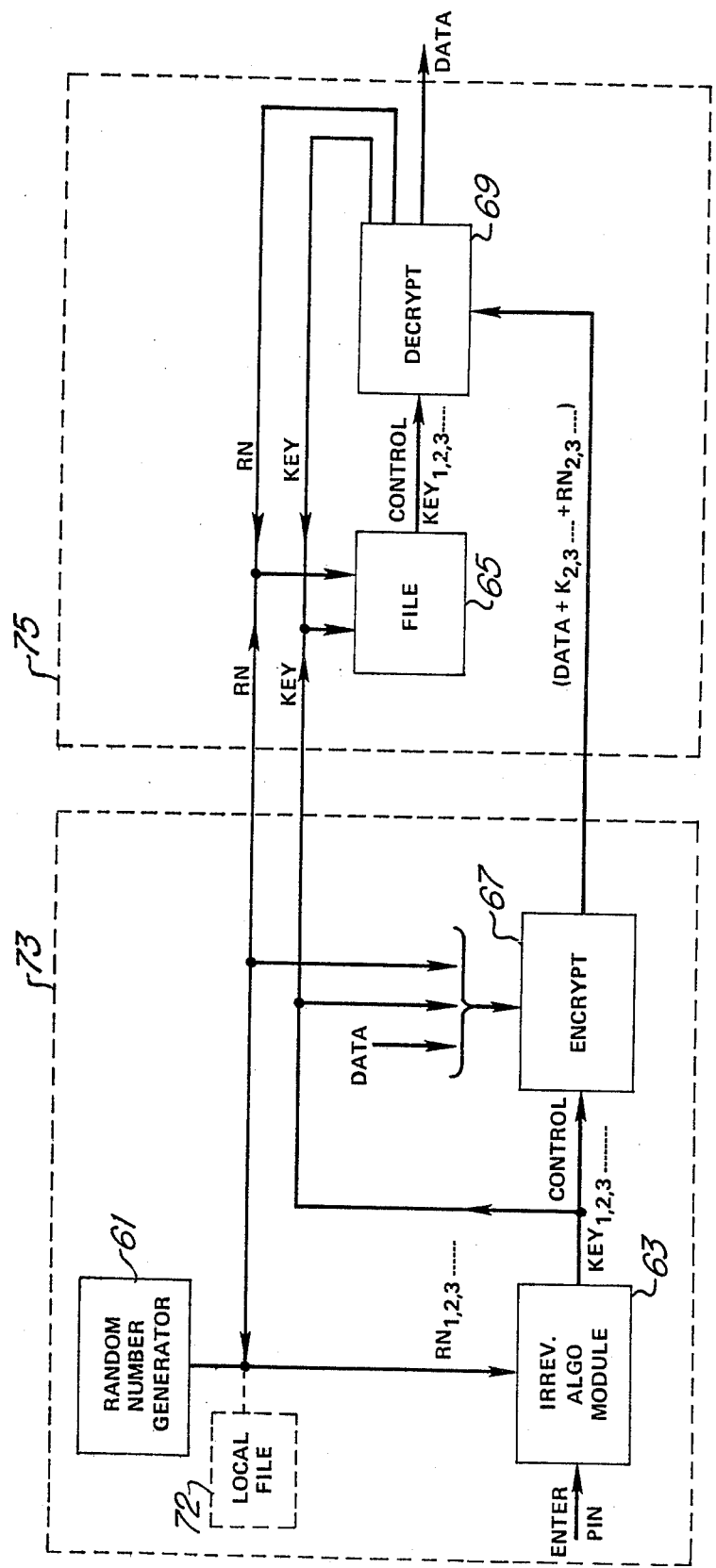
FIGS. 4A and 4B are block diagrams showing, respectively, still other alternative embodiments of the apparatus and method of the present invention.
Figure 4B:
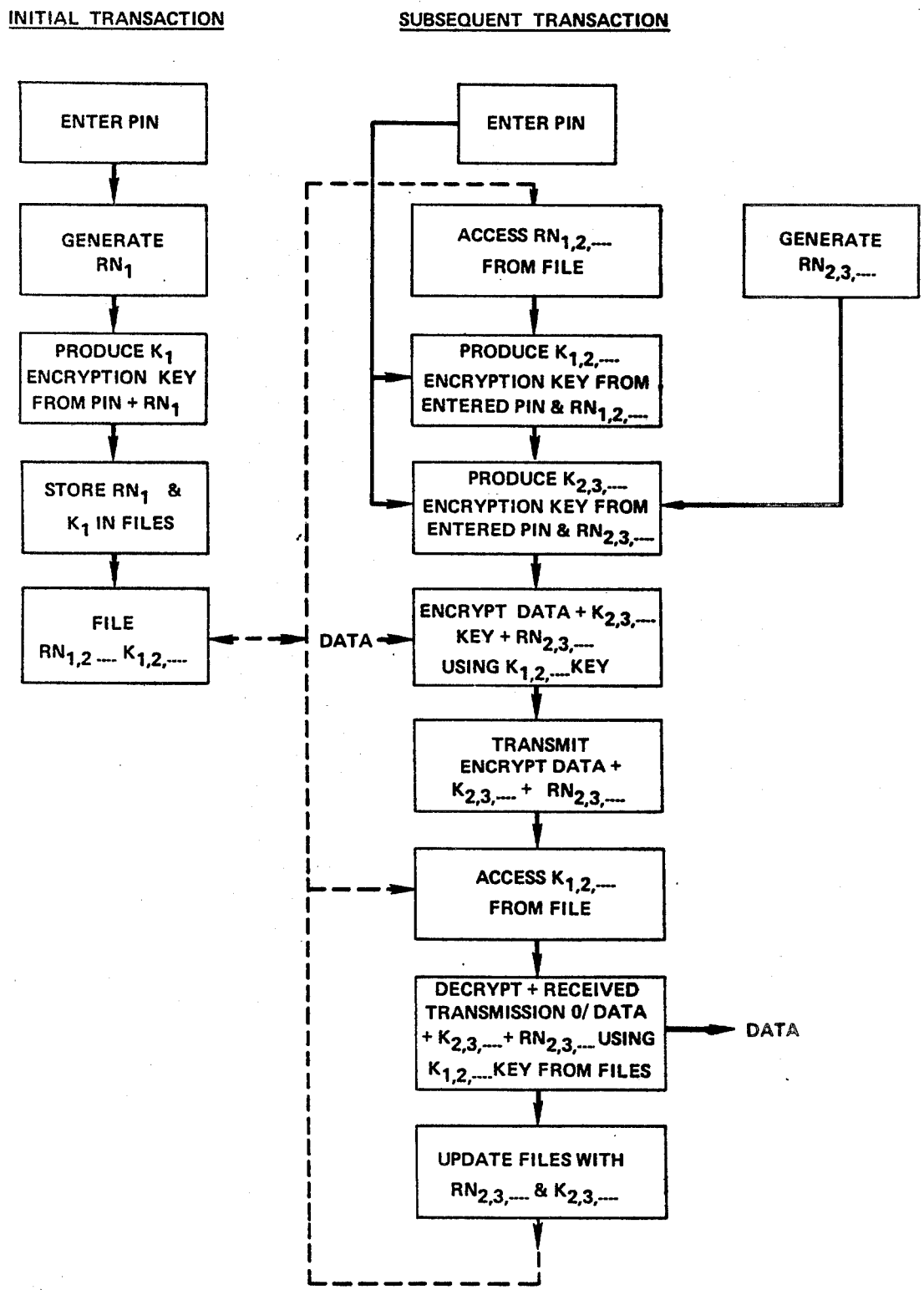

In the embodiment of the present invention shown in FIGS. 4A and 4B, there is no need to transmit the PIN from user station 73 to processing station 75, and no need to store PIN information in a file. As shown in FIGS. 4A and 4B, the system is first initialized in preparation for user transactions. The PIN is entered by the user during initialization and random number generator 61 generates a random number ($RN_1$) and applies the $RN_1$ to irreversible algorithm module 63 of the type previously described. Module 63 combines the PIN and $RN_1$ information and produces therefrom a first encryption key ($KEY_1$) to be used in later encryption of data. The $RN_1$ and $KEY_1$ are then stored for later retrieval in a storage file 65 at the processing station 75 (and optionally the random number may also be stored in a local file 72).

In commencing a transaction, the user first enters his PIN into the algorithm module 63. In response to the entered PIN, and in response to $RN_1$ which is accessed from file 65 (or optionally from local file 72), the module 63 reproduces the encryption key ($KEY_1$) which is applied to the control input of the encryption module 67 (say, of the National Bureau of Standards type previously described). With the encryption module 67 set to encode in accordance with $KEY_1$, another random number ($RN_2$) is generated by random number generator 61, and is applied to modules 63 and 67. The module 63 is able to produce an encryption key ($KEY_2$) from the applied $RN_2$ and from the PIN that is available during the present user transaction. $KEY_2$ and $RN_2$ which was associated with $KEY_2$ are included with the applied data (which data may include a fixed alphanumeric reference) for encoding by module 67 under the control of $KEY_1$ to produce the encrypted message "DATA+$RN_2$+$KEY_2$". This encrypted message is then transmitted from user station 73 to processing station 75 where decryption module 69 (matching encoding module 67) decrypts or decodes the encrypted message in accordance with $KEY_1$ which is accessed from the file 65 where it was originally entered during the initialization operation previously described. The DATA is thus retrieved in clear text and the $RN_2$ and the $KEY_2$ are also separately available for updating file 65 (and optionally local file 72) with $RN_2$ and $KEY_2$ in place of $RN_1$ and $KEY_1$, respectively.

In a subsequent transaction, the user again enters his PIN into the algorithm module 63. In response to the entered PIN, and in response to the updated $RN_2$ accessed from file 65 (or from local file 72), the module 63 reproduces the encryption key ($KEY_2$). With the encryption module 67 set to encode applied data in accordance with $KEY_2$, the random number generator 61 produces another random number $RN_3$ which is applied to the algorithm module 63 along with the PIN that is available during the present transaction to produce another encryption key ($KEY_3$). $KEY_3$ and $RN_3$ are included with the DATA that is applied to the encoding module 67 which produces the encrypted message "DATA+$RN_3$+$KEY_3$" when encrypted under the control of $KEY_2$. This encrypted message is then transmitted from user station 73 to processing station 75, where decoding module 69 decrypts the encrypted message in accordance with the $KEY_2$ which is accessed as the updated entry from file 65. The DATA is thus retrieved in clear text and the $RN_3$ and $KEY_3$ are again available to update the file 65 (and local file 72) for use in subsequent transactions.

The reference data previously referred to as being included with the input DATA may simply be a standard code word which must be extracted at the output of module 69 as an indication that the user inserted the proper PIN. In this way, the encrypted message transmitted to and received by the processing station 75 can be promptly decrypted to verify the PIN before the file 65 (or local file 72) is updated with keys and random numbers which would not relate to the authorized PIN.

Thus, it can be seen from FIGS. 4A and 4B that not only is PIN information not stored or transmitted from user station 73 to user station 75 but, for added security, the key used to encrypt data in response to a given user transaction is not the same key that is used to decrypt the encrypted data during such transaction. Also, it should be noted that the stored code words are updated in each transaction and that these code words are under the control of the user.

Figure 5A:
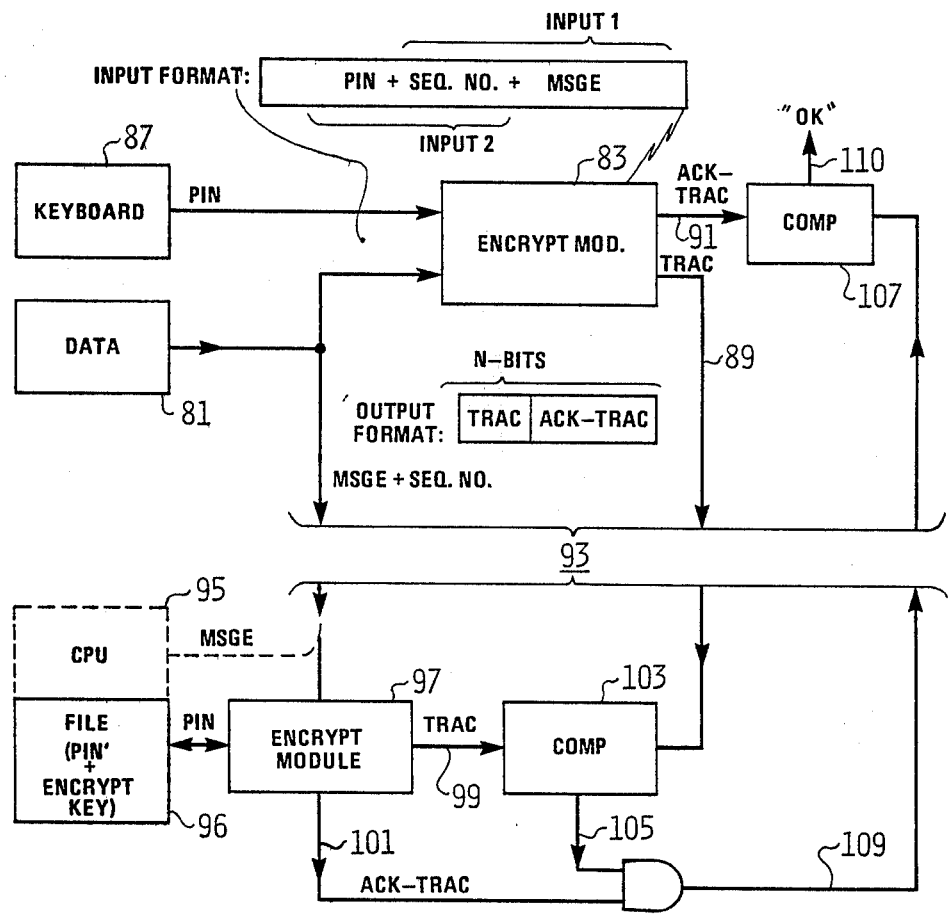
FIG. 5A is a schematic block diagram of another embodiment of the present invention in which a transaction may be securely controlled at a remote location.

With the personal identification number of an authorized individual stored in encrypted form (PIN′) along with an encrypted key for that encryption of the PIN, a system is provided which enables the authorized individual to control various secured transactions at remote locations without the need for matched pairs of modules and without compromising the security of the system. In one embodiment of the system, as shown in the block diagram and flow chart of FIGS. 5A and 5B, respectively, the data 81 or message MSGE to be secured against alteration or unauthorized use (such as account number, amount of money being transferred, type of transfer, etc.) is combined with a sequence number (such as data and time) to supply to an encryption algorithm module 83. Of course, the data may be in clear text or in encoded form. In addition, the authorized person introduces his PIN via keyboard 87 or other entry device to provide another input to the module 83. This algorithm used in module 83 may be of the National Bureau of Standards type previously described, or of the type described in the aforementioned U.S. Patent issued to Atalla and Liu. The module 83 accepts the two inputs (or obtains two inputs from any combination of all the entry bits involved) in a format as shown in FIG. 5A and encodes the input information in accordance with the operating algorithm thereof to produce an N-bit output, one portion of which serves as the TRansfer Authorization Code (TRAC) signal 89 and another portion of which serves as the ACKnowledgement-TRansfer Authorization Code (ACK-TRAC) signal 91. Only the data or message MSGE plus sequence number plus TRAC output 89 are transmitted over a data link 93 to a remote location. Note that the PIN for the authorized individual is not transmitted from the location where introduced and is not stored in any file.

Thus, the data link 93 may be a simple and convenient data link or voice communication over telephone lines or a writing transmitted by telegram or mail, or the like. Since the TRAC signal 89 was generated using the PIN and the sequence number and the MSGE, any alteration of the MSGE or TRAC or sequence number (e.g., by an unauthorized attempt to rerun a cash withdrawal transaction) will alter the transmitted TRAC which will not compare favorably with the TRAC signal regenerated at the receiving location. Thus, an unauthorized alteration of any part of the MSGE, SEQ. NO. or TRAC during transmission will result in unfavorable comparison and rejection of the received transmission, as later described.

The received transmission is compared for parity of TRAC signals by first accessing the memory 96 of a local central processing unit or computer 95 for the PIN of the authorized individual that is stored in encrypted form, together with the encrypted key that was used to encrypt the PIn and also stored in the memory, as previously described. From this information obtained from the computer memory 96, the PIN of the authorized individual may be regenerated using the encryption module and is then only available internally for use in regenerating a TRAC signal at the receiving location. The PIN thus regenerated from information accessed out of the computer memory 96 and the transmitted MSGE and SEQ. NO. received at the remote location are encrypted in module 97 which operates according to exactly the same algorithm as is used in module 83 on the two input signals that are applied in exactly the same format as is applied to module 83. The resulting TRAC 99 and ACK-TRAC 101 outputs appear as a composite N-bit output in the same format as the outputs of module 83. Thus, the transmitted and received TRAC signal 89 must be identical to the regenerated TRAC signal 99 for the received MSGE and SEQ. NO. signals and encrypted PIN and encrypted key signals from memory 96. These two TRAC signals are compared in comparator 103 to produce an output 105 in response to parity of the two TRAC signals, and this parity output signal gates out the ACK-TRAC signal 101 for retransmission back to the originating location via a convenient communication link 93. Of course, the local computer 95 is also enabled to operate on the MSGE signal, for example, to debit an account, update a file, etc. If no favorable comparison of TRAC signals in comparator 103 is obtained, the received MSGE signal need not be acted upon and a suitable non-response signal may be returned to the originating location.

For a favorable comparison of TRAC signals, the resulting ACK-TRAC signal is retransmitted and received back at the originating location and is compared in comparator 107 with the ACK-TRAC signal that was originally generated from the MSGE and SEQ. NO. signals and PIN signal received from the authorized individual upon initiation of the transaction. These signals must be identical for the given MSGE and SEQ. NO. signals and proper PIN from the authorized individual applied in identical formats to identical modules 83 and 97. Thus, unfavorable comparison of the two ACK-TRAC signals in comparator 107 is an indication of a possible alteration of one or more of the signals from which each of the ACK-TRAC signals is generated, or of an error or alteration in the retransmitted ACK-TRAC signal 109. Of course, an output 110 generated upon favorable comparison of the two ACK-TRAC signals in comparator 107 is an indication of completion of the transaction (e.g., debiting an account, dispensing cash, etc.), which was initiated by the individual whose PIN 87 was introduced.

Figure 5B:
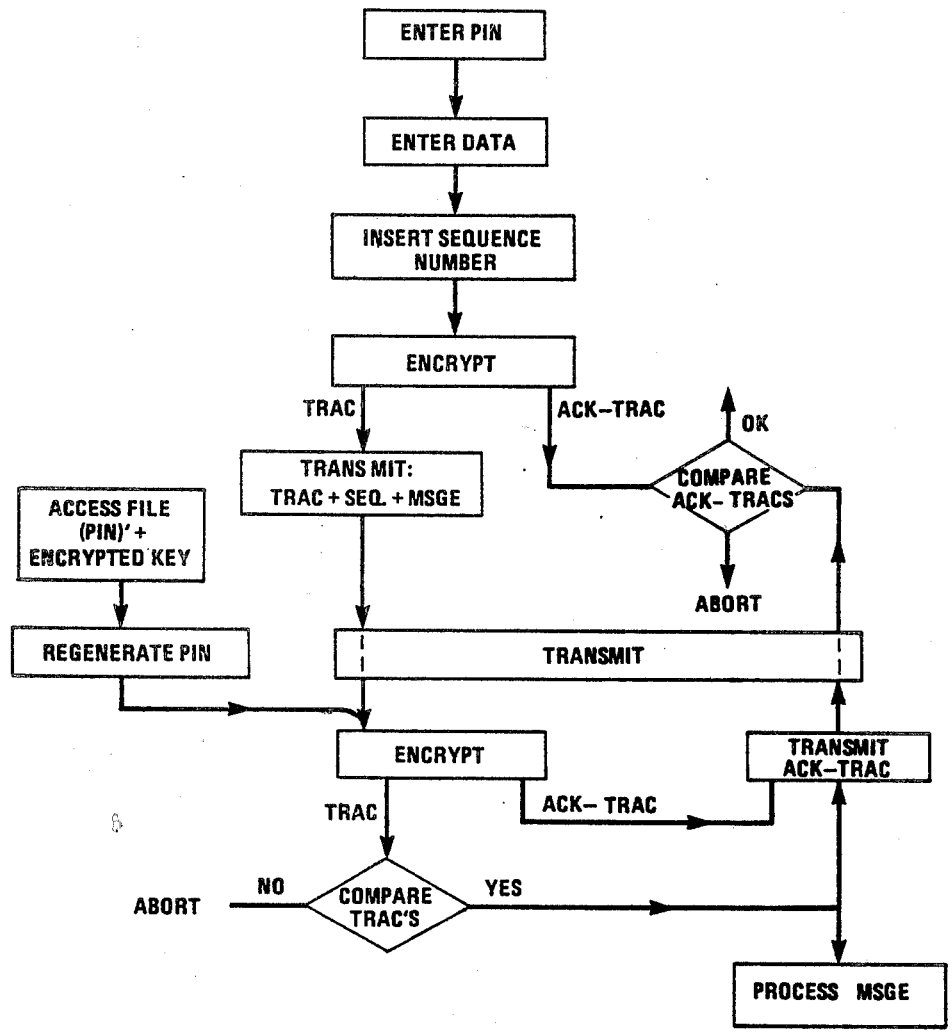
FIG. 5B is a flow chart illustrating the operation of the embodiment of FIG. 5A.

It should be noted that the system operated as described in connection with FIGS. 5A and 5B assures the proper identity of the individual whose encrypted PIN and encrypted key are on file at the receiving location (e.g., bank). Also, the MSGE cannot be altered and cannot be replayed without detection, so that convenient less secured data-transmission links can be used without degrading the security of the over-all system. It should be noted also that the individual's PIN is not transmitted in clear text from anywhere within the system, and that ample record-producing checkpoints are provided for later, convenient auditing procedures.

Figure 6:
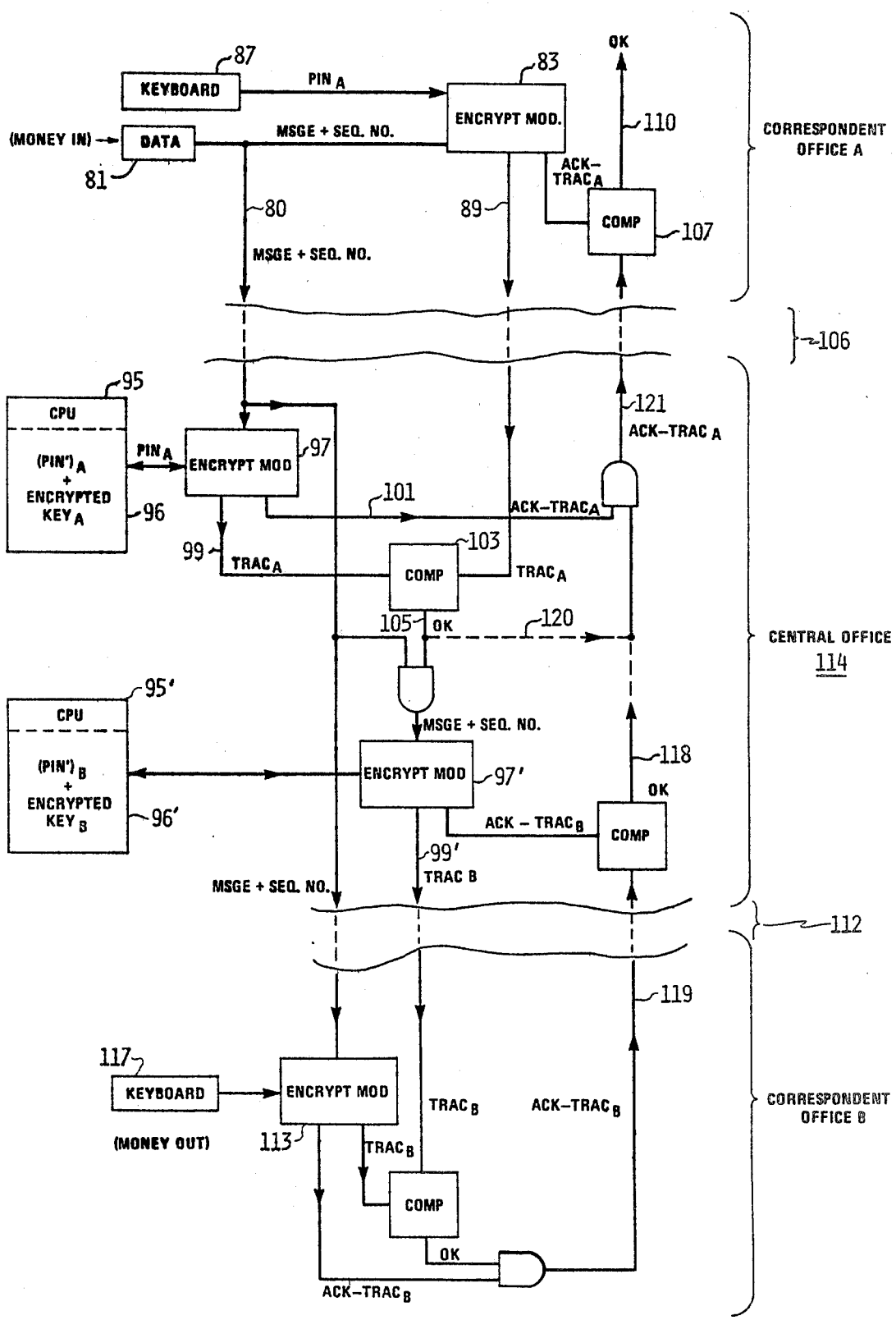
FIGS. 6 and, 7A and 7B are illustrations of other embodiments of the present invention in which transactions may be securely controlled at remote branch locations of remote central offices.

Referring now to the illustration of FIG. 6, there are shown the method and means for controlling a transaction such as a "wire transfer" of funds from a remote location with a high degree of security against unauthorized manipulation. In this embodiment, the components of the system which are similar to the components of the system in FIG. 5A are similarly labeled. Thus, an authorized individual located at correspondent office A (e.g., a bank, trucking company, etc.) is able to control a transaction such as the "wire transfer" of money for withdrawal from correspondent office B with the aid of the circuitry, files and operation of the central office. As in the embodiment of FIG. 5A, an individual (e.g., manager or officer, etc.) whose encrypted PIN and encrypting key are on file at the central office is able to generate a $TRAC_A$ signal 89, as previously described, which is transmitted to the central office over a convenient data transmission link 106, along with the composite signal 80 including data or message or instructions MSGE and appropriate sequence number (e.g., data and time). These signals when received at the central office are used to regenerate a PIN for the individual in the manner previously described from the information about that individual that is stored in the central computer 95 and memory 96. The PIN thus produced is then available only internally to produce a $TRAC_A$ signal 99 for comparison with the transmitted and received $TRAC_A$ signal 89 in comparator 103. However, in this embodiment the output signal 105 that is generated in response to favorable comparison is used to generate another or $TRAC_B$ signal for transmission to the correspondent office B. Optionally, this signal may also be used 120 to gate out an ACK-$TRAC_A$ signal for transmission back to the originating office A. The new $TRAC_B$ signal is produced by accessing from storage in computer memory (which, of course, may be the same computer and memory but at a different memory address location) the encrypted $PIN_B$ and encrypted $KEY_B$ for an authorized individual (e.g., manager or officer, etc.) at correspondent office B. This PIN information is used interactively with the irreversible algorithm module 97' (which, of course, may be the same module 97 used in the serial-state operation of the same computer 95, 96) in order to generate the $PIN_B$ which is only available internally for use in generating the $TRAC_B$ signal 99' in the manner previously described in connection with the $TRAC_A$ signal.

The $TRAC_B$ signal and the MSGE and SEQ. NO. signals may then be transmitted over the data link 112 to the correspondent office B. There, the $PIN_B$ may be manually supplied via keyboard 117 by the authorized individual (or may be regenerated in the manner previously described by interactive operation of computer 115 with the encryption module 113 from PIN information accessed from storage in computer memory).

The circuitry at correspondent office B operates in the manner previously described in connection with the receiving location in FIG. 5A to produce ACK-$TRAC_B$ signal 119 that is transmitted back to the central office. When received there, the ACK-$TRAC_B$ signal is compared with the ACK-$TRAC_B$ signal locally generated in the manner previously described. The signal 118 generated in response to favorable comparison of these two signals indicates that the requested transaction was completed at office B. Optionally, the signal 118 may be used to enable the gate to transmit the ACK-$TRAC_A$ signal 121 back to the correspondent office A where it is compared with the original ACK-$TRAC_A$ signal generated in the manner described in connection with FIG. 5A. Favorable comparison of all the ACK-TRAC signals would provide indication at office A that the requested transaction was completed at office B.

Figure 7A:
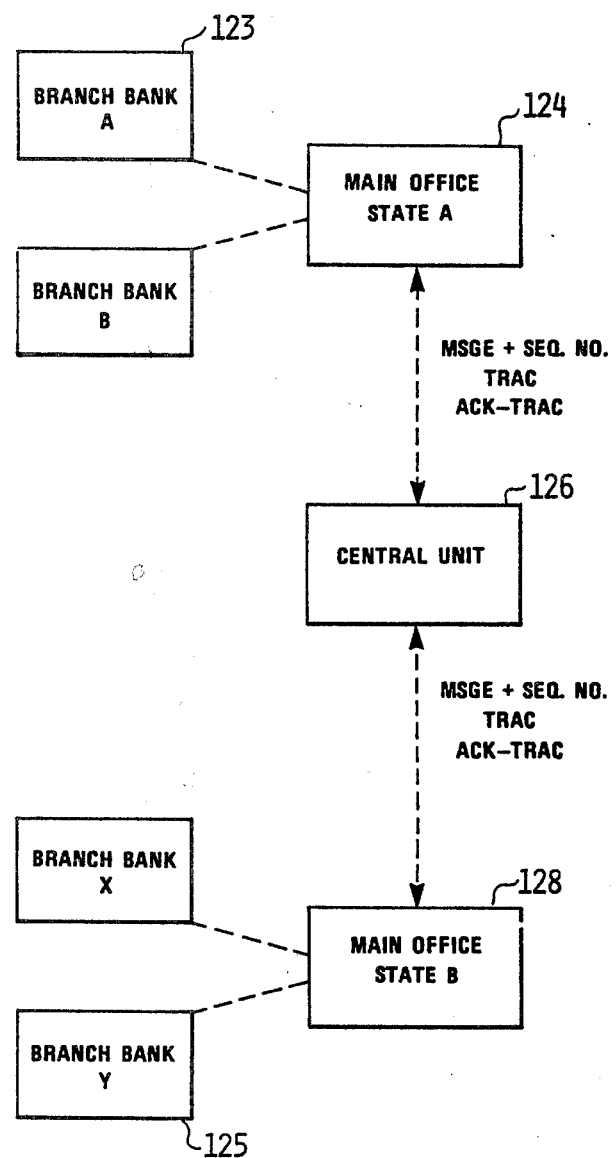
Figure 7B:
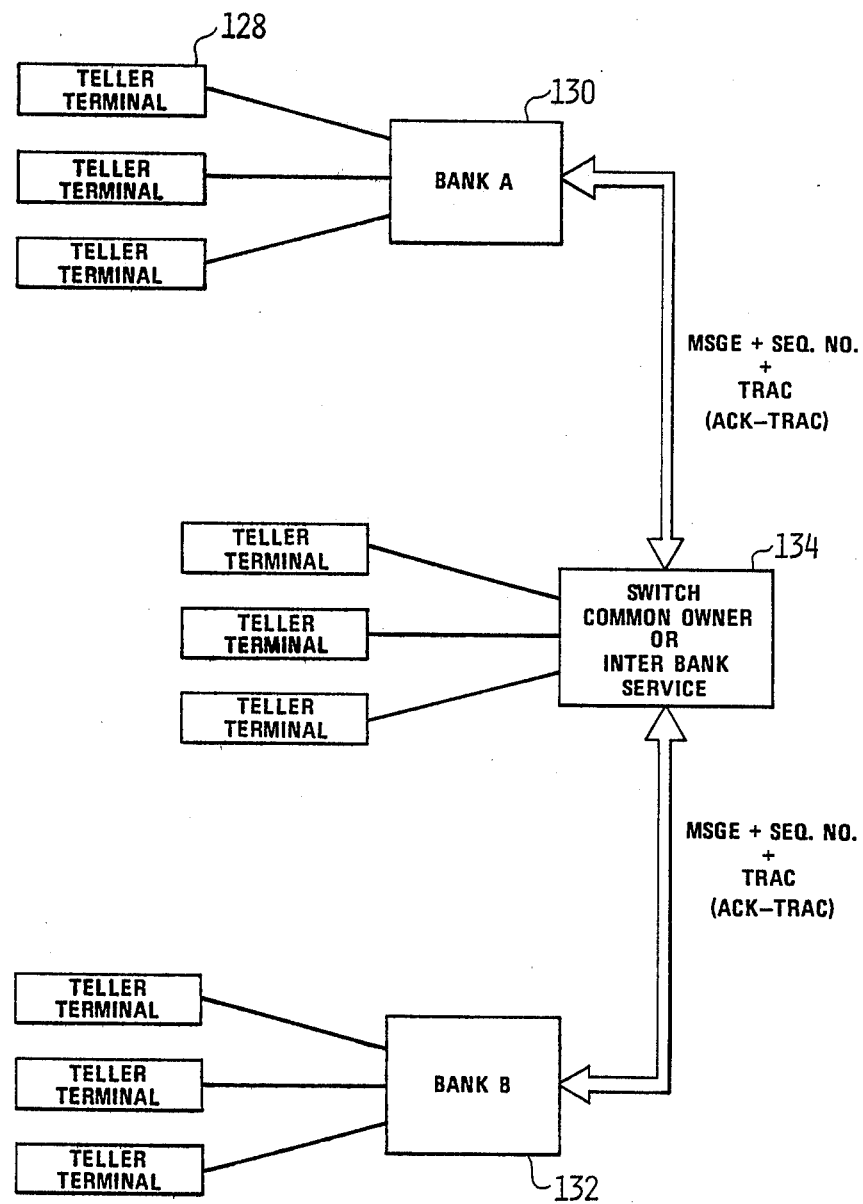

Thus, the instructions and acknowledgements required to command a transaction at the remote office are transmitted and returned with substantial security against errors and unauthorized alterations, and with ample provisions for auditable records of the transaction. It should be readily apparent that transactions between remote offices of unassociated businesses may thus be conducted in this manner through one or more "central" office links, as shown, for example, in FIG. 7 in connection with interbank transactions. By introducing additional circuitry similar to that which was described in connection with central office 114 for each central unit or office between the ultimate end-users, a transaction may be initiated by one BANK A 123 and be consummated at BANK Y 125 under command and control of BANK A and with verification back to BANK A, all with a high degree of immunity from errors and unauthorized alterations. This is accomplished by retaining in the files of office 124 the requisite encrypted PIN's and encrypted keys therefor for each of its branches (or the officers thereof), and by retaining in the files of office 128 the requisite encrypted PIN's and encrypted keys therefor for each of its branches (or the officers thereof). Then, the central unit 126 need only retain in its files the requisite encrypted PIN's and encrypted keys therefor for each of offices 124 and 128 (or the officers thereof) in order to complete secured transactions in the manner previously described.

In similar manner, an interchange transaction between bank A and bank B may be accomplished by using a data switch to route customer information and TRAC signals between banks A and B. Thus, data from a customer of one bank 132 which is entered on a Teller Terminal 128' such as a conventional automatic teller machine (ATM) in one bank 130 may be routed to the proper bank via the data switch 134 for comparison with data on file for that customer at bank 132. The TRAC, MSGE and SEQ. NO. generated in response to the customer's entry of his own PIN may thus be transferred via switch 134 to the proper bank 132 for comparison there with data on file, all as previously described, for example, with respect to the embodiment of FIG. 6.

Figure 8:
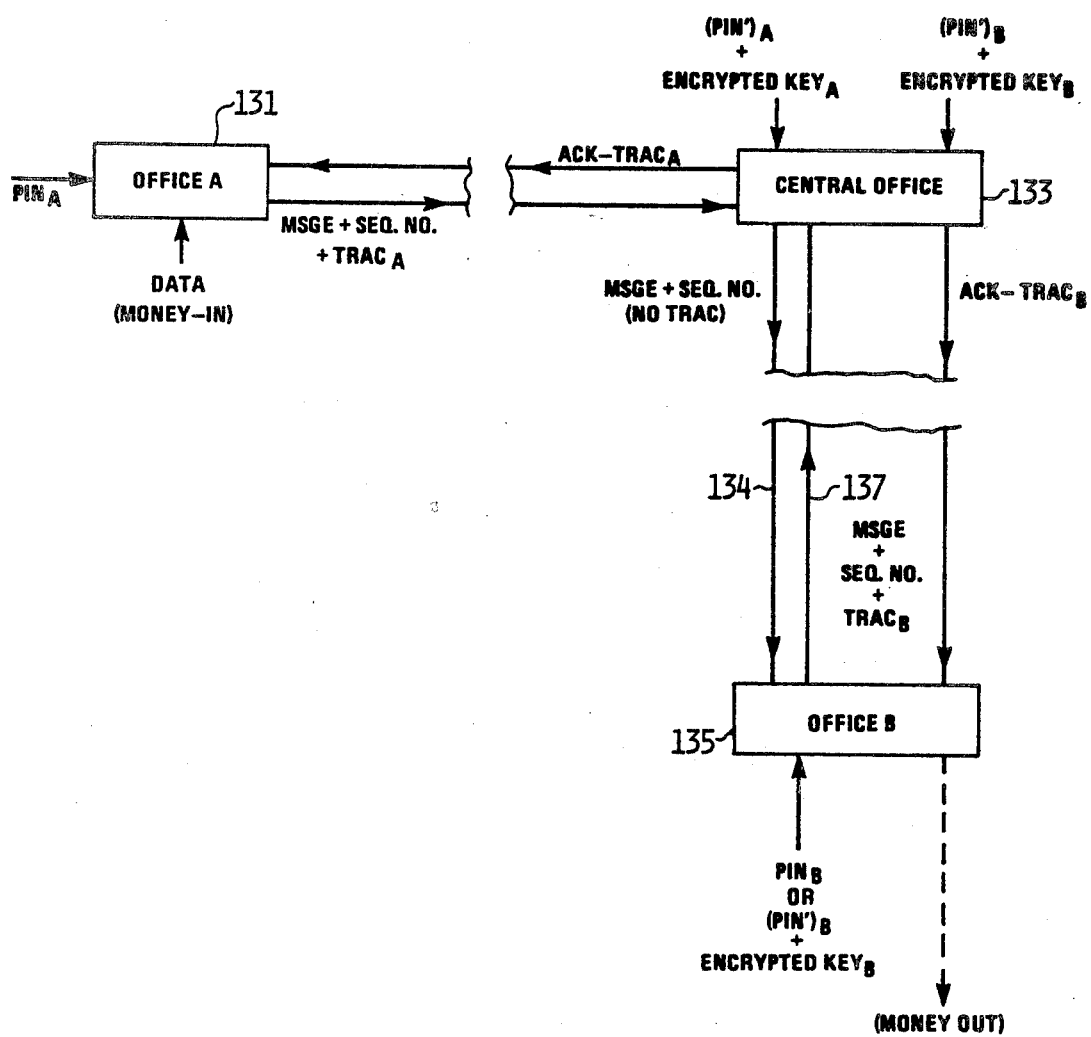
FIG. 8 is an illustration of another embodiment of the present invention using prestored identification information about two individuals or entities in order to securely control a transaction at a remote branch location of a remote central office.

Referring now to the illustration of FIG. 8, there is shown another embodiment of the present invention in which a central office is able to implement the command and confirmation of a transaction consummated between remote offices. In this embodiment, the apparatus and method of operation for transferring data between office A 131 and central office 133 is similar to the operation previously described in connection with FIGS. 5A and 5B, except that upon favorable comparison of $TRAC_A$ signals, only the MSGE and SEQ. NO. signals 134 are retransmitted to the office B 135 and, optionally, the ACK-$TRAC_A$ signal may also be returned to office A 131 as an acknowledgment of proper receipt of the transmitted information. At office B, the $PIN_B$ signal for another authorized individual is provided for generating a $TRAC_B$ signal as previously described for transmission back to the central office 133 with the MSGE and SEQ. NO. signals 137. At the central office 133 the $PIN_B$ must be regenerated from stored information in order to produce a $TRAC_B$ signal therefrom in combination with the MSGE and SEQ. NO. signals, as previously described. Upon favorable comparison of $TRAC_B$ signals at the central office 133, the ACK-$TRAC_B$ signal may be transmitted back to the receiving office B 135 as a confirmation of unaltered communication of data between office B 135 and the central office 133.

Figure 9:
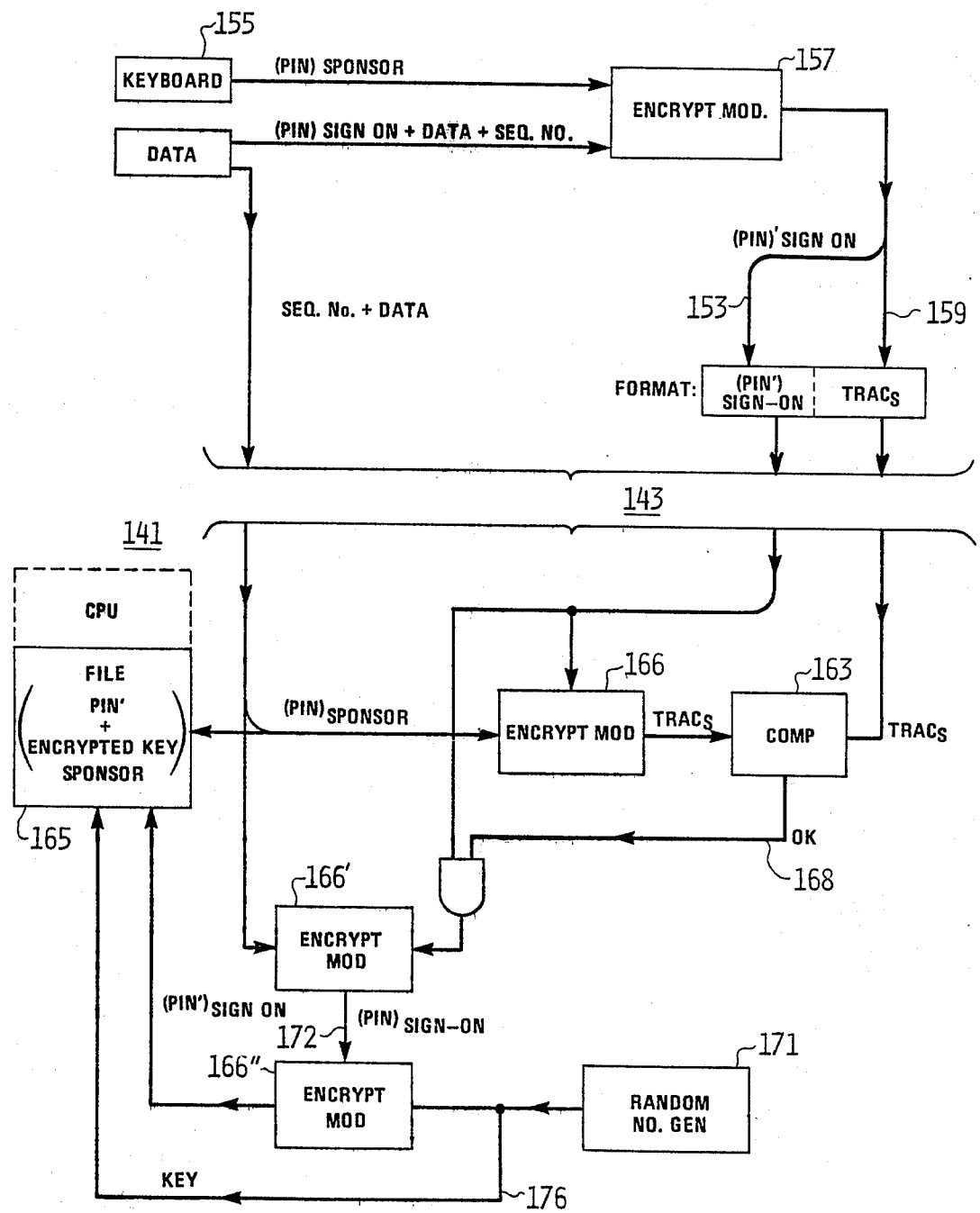
FIG. 9 is an illustration of an embodiment of the present invention in which encoded identification information for an individual may be stored remotely using a sponsor and associated identification information.

Referring now to the illustration of FIG. 9, there are shown the apparatus and the method involved in remotely signing on a new individual who is to receive authorization to use the system. This is accomplished with the aid of a sponsor who is already authorized to use the system and whose PIN is already stored in encrypted form in the remote (say, central) location 141. It is possible in this embodiment of the present invention to introduce a new PIN for a new individual at a remote storage file with a high degree of security while using the transmission data link 143 in a manner similar to that which was described above. Note that this embodiment requires the entry of a new PIN for the new individual as part of data (entered, for example, by a keyboard) to be encrypted to the encryption module 157. This information, along with a sequence number (say, data and time) is then encrypted in the encryption module 157 during a first operating state using the PIN of the sponsor as part of the encryption key. The data may include an indication of the bit-length of the PIN for the new individual, etc., and the encryption thereof yields as encrypted PIN 153 for the new individual. Also, the PIN for the sponsor, entered by keyboard 155 along with other data and sequence number and encrypted PIN for the new individual can be applied to the encryption module 157 operating during a sequential state or time-shared mode to produce a $TRAC_S$ signal 159. This $TRAC_S$ signal is transmitted along with the encrypted PIN' signal 153 for the new individual and data and the sequence number signal 161 over data link 143 to the remote or central location 141.

At the remote location the PIN of the sponsor is decrypted by the encryption module 166 from information including encrypted PIN' and encrypted key for the sponsor contained in computer memory 165. Thus, once the PIN for the sponsor is rengerated, it is available (internally only) in combination with the received SEQ. NO. and other data as one input to the module 166 while the received encrypted PIN' for the new individual serves as another input. This module then operates according to the same algorithm as module 157 to produde a $TRAC_S$ signal which should compare favorably with the received $TRAC_S$ 159. When so favorably compared (indicating transmission and reception without alteration), the resulting output 168 then controls the encryption of the PIN for the new individual. This is accomplished by first decrypting the received PIN' for the new individual to obtain the PIN for the new individual in clear text (internally only). This is obtained by decrypting in encryption module 166' the sequence number and the received encrypted PIN for the new individual. The encryption module 166' operates with the same algorithm as module 157 (and, of course, may be the same module as module 166 operating in a sequential state or time-shared mode) to yield the PIN 172 for the new individual in clear text (internally only). A random number from generator 171 it then combined with the PIN for the new individual 172 in an encryption module 166" (which, of course, can be the same as module 166 operating in a sequential state or time-shared mode) to produce the encrypted PIN for the new individual which can be stored in memory 165 along with the random number 176 used to encrypt the PIN. Of course, the (PIN') for a new individual may also be transmitted over a data link 143 to a remote location 141 with additional data necessary to identify the individual, the extent of his authority, data about the number of bits in the new individual's PIN, the encryption key, etc. Either way, a new individual may be incorporated into a total system from a remote or branch location and thereby obviate the need to sign on only a central location.

Figure 10:
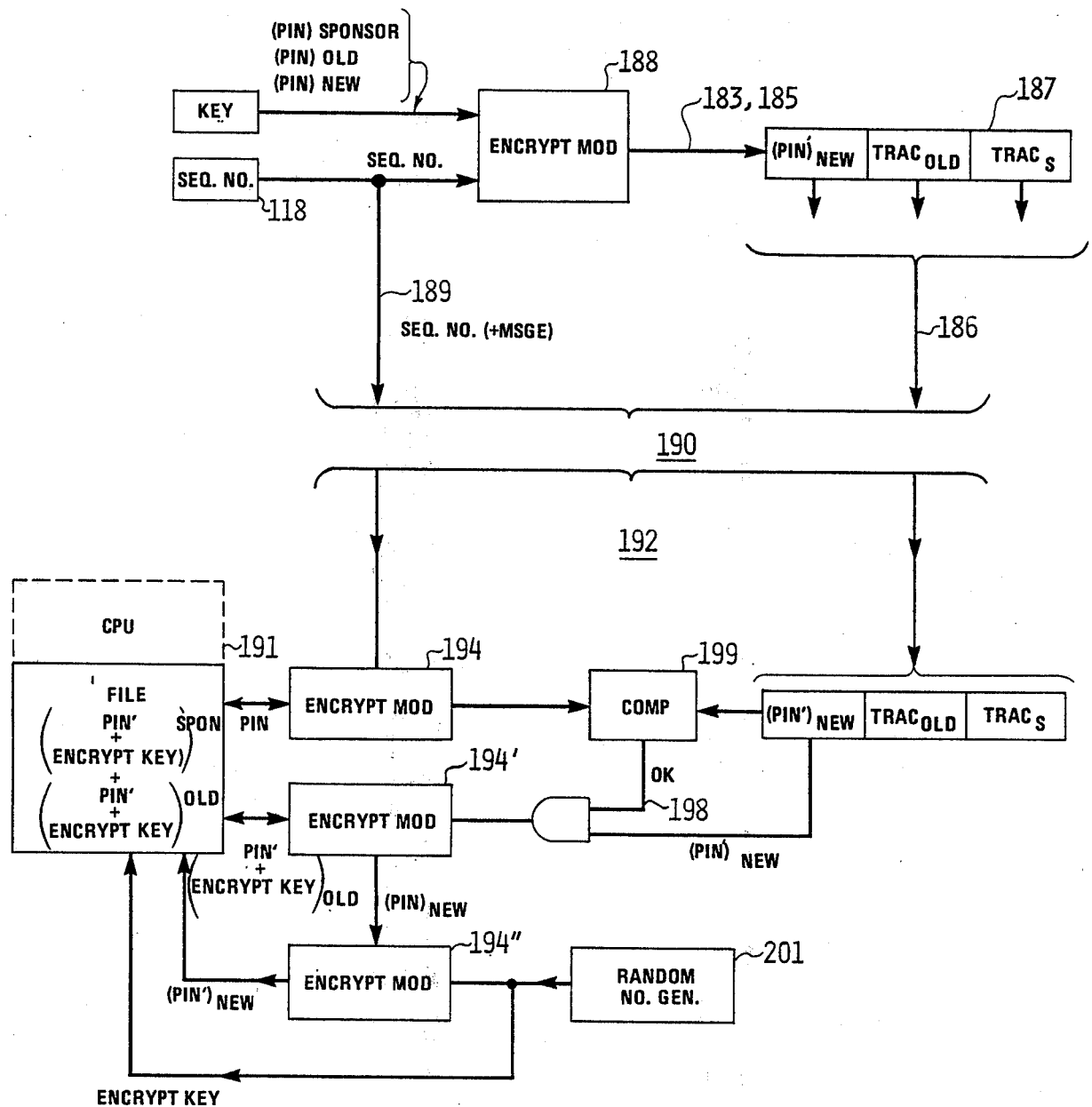
FIG. 10 is an illustration of an embodiment of the present invention in which encoded identification information for an individual that is stored remotely may be securely changed using a sponsor and associated identification information.

With reference to the illustration of FIG. 10, it should be noted that an individual may also change his own PIN from a remote location with the aid of a sponsor.

The sequence number 181 may be used to prepare a TRAC$_S$ signal 183 for the sponsor and another TRACOLD signal 185 for the old PIN of an established individual, all as previously described. These TRAC signals may be stored in a buffer 187 for assemblage into a format, as illutrated. In addition, an encrypted form of the new PIN for such individual is also generated by the encryption module 188 using the sponsor's PIN alone or in combination with a SEQ. NO., etc., as the encryption key. A composite singal 186, for example, in a format as illustrated, may be transmitted with the SEQ. NO. signal 189 over the data transmission link 190 to the remote location 192. Then, using an encryption module 194 (shown in three circuit locations for clarity and comprehension, but singularly usable in different sequential states or time-shared modes for the operations indicated), the encrypted PIN and encrypted key therefor for the sponsor stored in file 191 may be operated with module 194 to regenerate the PIN (internally only) for the sponsor according to the same algorithm used in module 188. This can then be combined in the module 194 with the received SEQ. No signal 189 to produce the TRACS signal for the sponsor using the same algorithm as in module 188. Similarly, the TRAC signal for the old PIN of the individual may also be regenerated from information contained in file 191, all as previously described. These two TRAC signals may thus be compared in comparator 199 with the received TRAC signals in the same format. If comparison is favorable, indicating that the TRAC signal for the sponsor's PIN and the TRAC signal for the old PIN are all right, then the resulting output signal 198 controls the decryption of the encrypted new PIN for the individual using that individual's old PIN (available only internally) as the decryption key in the module 194'. The resulting new PIN for the individual may be encrypted in module 194" using a random number from generator 201 to yield the encrypted new PIN and encryption key therefor for storage in file 191, as previously described. Thus, when an individual is to be introduced into the system for the first time, he may merely be given a PIN that is set into a central file solely for the purpose of enabling him to change the PIN to one of his own, secret selections as the first transaction.

It should be noted that for enhanced security or control, two or more individuals, each having a PIN that is stored remotely in encrypted form along with the encryption keys therefor, may combine their PIN's to produce a composite TRAC signal, for example, as described in connection with FIG. 5A, that can then be compared with a TRAC signal regenerated from the two PIN's and encryption keys therefor stored in the remote file. The rest of the acknowledgment message may proceed as described in connection with FIG. 5A.

In each of the embodiments above, additional information such as a MSGE or DATA signal may always be sent to the remote location along with the TRAC signal(s) transmitted. Such MSGE or DATA signals may identify the first number of characters of one input to an encryption module that represent the number of bits in the PIN, or the like. Also, it should be understood that in each of the embodiments of the present invention described above sequential numbers may be used in place of random numbers used in the identification or encoding schemes, or random numbers may be used in place of sequential numbers. This permits the systems to exclude the repeating of the same data or information in subsequent transactions by enabling a check for parity of either random or sequential numbers at the receiving stations. Also, as used herein, "individ- Therefore, the present invention may operate without paired modules at remote ends of a data transmission link, provided, of course, that encryption modules of similar type and operable according to the identical algorithm are contained in each location. Then, the secret PIN of an individual remains secret at the entry point (and is either stored in encrypted form or regenerated internally only elsewhere in the system). This facilitates the convenient generation of a TRAC signal, for example, by a simple calculator-type device containing an encryption module, and this TRAC signal may then be openly communicated to the remote location by telephone, telegram, etc., along with the transaction message or data, all without possibility of unauthorized alteration. Such a user's device may simply calculate a TRAC number for all the data, PIN and SEQ. NO. supplied, and this TRAC number becomes that user's unique signature for that single transaction. Audit records pertaining to all such transactions are therefore amply available and more readily recallable than the microfilmed records of paper transactions currently in use.

I claim:

1. A method of securing a data-handling transaction initiated by an authorized individual utilizing prestored identification information about the individual and identification information supplied by the individual, the method comprising:
    generating a selected number;
    forming a first input as the combination of at least two of the signals selected from the data involved in the transaction, and the selected number and the identification information supplied by the individual;
    forming a second input as the combination of at least another two of said signals;
    logically encrypting the first and second inputs to form a transaction authorization code, according to a selected encoding scheme;
    transmitting the transaction authorization code with data involved in the transaction and with the selected number to a remote location;
    logically encrypting the prestored identification information about the individual and the data involved in the transaction and the selected number received at the remote location to form a transaction authorization code in accordance with said selected encoding scheme; and
    comparing the transaction authorization codes at the remote location to provide an output indication upon parity thereof of the unaltered transmission and reception of the selected number, the transaction authorization code and the data involved in the transaction by the authorized individual.

2. The method according to claim 1 wherein:
    the step of logically encrypting the first and second inputs also forms an acknowledgment code in accordance with one encoding scheme;
    the step of logically encrypting at the remote location also forms an acknowledgment code in accordance with said one encoding scheme;
    the output indication of parity upon comparison of said transaction authorization codes enables the retransmission of the acknowledgment code from the remote location to the initiating location; and including
    comparing the acknowledgement codes at the initiating location to provide a manifestation upon parity thereof of the unaltered transmission and reception of the selected number, the transaction authorization code, and the data involved in the transaction by the authorized individual.

3. The method according to claim 1 comprising the additional steps of:
encoding a secret personal identification number for the authorized individual with a key code according to an encryption scheme;
storing at the remote location the resultant encoded personal identification number and the key code therefor; and
the step of logically encrypting the prestored identification information includes decoding the stored encoded personal identification number using the stored key code therefor in accordance with said encryption scheme to provide the personal identification number for the individual.

4. The method according to claim 1 for controlling a data-handling transaction at a second location via data-handling transactions at a remote location involving a second authorized individual whose identification information is prestored at the second and remote locations, the method comprising:
said output indication initiates the logic encryption of the prestored identification information for the second authorized individual and the data involved in the transaction and the selected number to form a second transaction authorization code in accordance with one encoding scheme;
transmitting the second transaction authorization code with the data involved in the transaction and with the selected number to the second location;
logically encrypting the prestored identification information about the second individual and the data involved in the transaction and the selected number received at the second location to form a second transaction authorization code in accordance with said one encoding scheme; and
comparing said second transaction authorization codes at said second location to provide a second output indication upon parity thereof of the unaltered transmission and reception via the remote location of the selected number, the data involved in the transaction, and the two transaction authorization codes for the two authorized individuals.

5. The method according to claim 4 wherein:
the step of logically encrypting the prestored identification information about the second individual and the data involved in the transaction and the selected number received at the second location also forms a second acknowledgment code in accordance with a second encoding scheme;
said second output indication enables retransmission of the second acknowledgment code from the second location to the remote location;
the step of logically encrypting at the remote location the prestored identification information for the stored authorized individual and the data involved in the transaction and the selected number also forms a second acknowledgment code in accordance with said second encoding scheme;
said second authorization codes are compared at said remote location to provide an output manifestation of unaltered transmission and reception of data involved in the transaction and selected number;
the logical encryption of the prestored identification information about the individual and the data involved in the transaction and the selected number received at the remote location also forms a third acknowledgment code in accordance with a third encoding scheme;
said output manifestation at the remote location enables retransmission of the third acknowledgment code from the remote location to the initial location;
the step of logically encrypting the first and second composite signals at the initial location also forms a third acknowledgment code in accordance with said third encoding scheme; and
said third acknowledgment codes are compared at the initial location to produce a resultant output representative of the unaltered transmission and reception of the selected number and data involved in the transaction from the initial location to the second location via the remote location and of acknowledgment codes from the second location to the initial location via the remote location.

6. The method according to claim 1 for controlling a data-handling transaction at a second location having prestored identification information about a second individual on file at the second and remote locations, the method comprising the steps of:
enabling the transmission of the selected number and the data involved in the transmission from the remote location to the second location in response to said output indication at the remote location;
logically encrypting at the second location the prestored identification information for the second individual, and the selected number and the data involved in the transaction as received from the remote location to form a transaction authorization code in accordance with a second selected encoding scheme;
transmitting to the remote location from the second location the data involved in the transaction and the selected number and the transaction authorization code formed in accordance with the second selected encoding scheme;
logically encrypting at the remote location the prestored identification information for the second individual, the selected number and the data involved in the transaction for forming a transaction authorization code in accordance with said second selected encoding scheme;
comparing at the remote location said transaction authorization codes formed in accordance with said second selected encoding schemes to provide an output manifestation of unaltered transmission and reception from the second location to the remote location of the data involved in the transaction, the selected number and the transaction authorization code for the second individual; and
transmitting to the initiating location a signal representation of the output manifestation in response to detection of parity at the remote location of the transaction authorization codes for the second individual.

7. The method according to claim 6 wherein:
the step of logically encrypting the first and second composite signals also forms an acknowledgment code in accordance with one encoding scheme;
said output manifestation at said remote location enables the logical encryption of the prestored identification information about the authorized individual, the selected number and the data involved in the transaction to form an acknowledgment code in accordance with said one encoding scheme;

said acknowledgment code is transmitted from said remote location to the initiating location for comparison of said acknowledgment codes to provide an indication upon parity thereof of the unaltered transmission and reception for the initiating location to the second location via the remote location of the data involved in the transaction and the selected number and of the unaltered transmission and reception of the acknowledgment code from the second location to the initiating location via the remote location.

8. The method according to claim 1 for storing additional identification information at a remote location wherein the data involved in the transaction includes the additional identification information encrypted in accordance with an auxiliary encoding scheme;

and including the step of decrypting the additional identification information at the remote location in accordance with said auxiliary encoding scheme in response to said output indication providing an encoding key code;

encoding the decrypted additional identification information in accordance with a logical encryption scheme; and storing the encoded additional identification information and the encoding key code therefor at the remote location.

9. The method of securing a transaction between first and second spaced locations using identification information stored at the second location, the method comprising the steps of:

encoding in logical combination at the first location the identification information and data pertaining to the transaction received thereat to produce a first encoded signal for transmission with the data to the second location, and also to produce a second encoded signal;

encoding according to the same logical combination the data pertaining to the transaction as received at the second location with the identification information stored thereat to produce a third encoded signal for comparison with the first encoded signal transmitted thereto, and also to produce fourth encoded signal;

initiating the transmission of the fourth encoded signal from the second location to the first location in response to parity in the comparison of the first and third encoded signals at the second location; and detecting parity in comparison of the fourth encoded signal as received at the first location with the second encoded signal produced thereat to signal completion of the transaction at the second location.

10. The method of securing a transaction between first and third spaced locations using identification information and auxiliary identification information stored at the second location, the method comprising the steps of:

encoding in logical combination at the first location the identification information and data pertaining to the transaction received thereat to produce an encoded signal for transmission with the data to the second location;

encoding according to the same logical combination the data pertaining to the transaction as received at the second location with the identification information stored thereat to produce an encoded signal for comparison with the encoded signal transmitted thereto;

initiating the transmission of the data pertaining to the transaction to a third location in response to parity in comparison of the encoded signals at the second location;

encoding in logical combination at the third location the data pertaining to the transaction as received thereat ad auxiliary identification information provided thereat to produce a second encoded signal for transmission back to the second location;

encoding at the second location according to said logical combination at the third location the data pertaining to the transaction and auxiliary identification information provided at the second location to produce a second encoded signal for comparison with the second encoded signal received thereat; and signalling completion of the transaction at the third location in response to detection of parity in comparison of the second encoded signals at the second location.

11. The method of securing a transaction between first and second spaced locations using identification information stored at the second location where the introduction of auxiliary identification information into the second location from the first location is the secured transaction, the method comprising the steps of:

encoding in logical combination at the first location the identification information and the auxiliary identification information and data pertaining to the transaction received thereat to produce an encoded signal and an encoded auxiliary identification information signal for transmission with the data to the second location;

encoding according to the same logical combination the data pertaining to the transaction as received at the second location with the identification information stored thereat to produce an encoded signal for comparison with the encoded signal transmitted thereto;

detecting parity in comparison of said encoded signals as received at the second location with the encoded signal produced thereat;

decoding with respect to said logical combination the data pertaining to the transaction and the encoded auxiliary identification information signal received at the second location to reproduce said auxiliary identification information at the second location in response to the detection of parity in said comparison of said encoded signals at the second location; and encoding said auxiliary identification information at the second location with a coding key according to a logical combination thereof to produce encrypted auxiliary identification information for storage with said coding key at the second location.

12. The method according to claim 11 for altering auxiliary identification information in storage at the second location as the secured transaction, the method comprising, in the step of encoding at the first location, encoding the original auxiliary identification information, the altered auxiliary identification information, the data, and the identification information according to said logical combination to produce an encoded auxiliary identification information signal, an encoded signal and an auxiliary encoded signal for transmission to the second location;

encoding according to said logical combination the data pertaining to the transaction and the identification information provided at the second location to produce an encoded signal and an auxiliary encoded signal for comparison, respectively, with the encoded signal and auxiliary encoded signal received thereat;

decoding at the second location with respect to said logical combination the encoded auxiliary identification information signal received thereat and the original auxiliary identification information provides at the second location to reproduce the altered auxiliary identification information in response to detection of parity in comparison of said encoded signals and auxiliary encoded signals; and encrypting the altered auxiliary identification information at the second location with an associated coding key according to a logical combination thereof to produce encrypted altered auxiliary identification information for substitution in storage with the associated coding key at the second location.

13. The method of securing a transaction between two entities at first and second spaced locations using identification information about the two entities stored at an intermediate location, the method comprising the steps of:

encoding in logical combination at the first location the identification information about one entity and data pertaining to the transaction to produce an encoded signal for transmission with the data to the intermediate location;

encoding according to the same logical combination the data pertaining to the transaction as received at the intermediate location with identification information stored thereat about the one entity to produce an encoded signal for comparison with the encoded signal received at the intermediate location;

detecting parity of the compared encoded signals to encode in logical combination the data pertaining to the transaction with stored identifying information about the other entity to produce an auxiliary encoded signal for transmission with the data to the second location; and encoding at the second location and in the same logical combination as used at the intermediate location to produce the auxiliary encoded signal, both the data received at the second location and the identifying information about the second entity to produce an auxiliary encoded signal for comparison with the auxiliary encoded signal received at the second location; and signalling the completion of the transaction in response to parity in the comparison of said auxiliary encoded signals.

14. The method according to claim 13 in which the steps of encoding at the first and intermediate locations include forming second encoded signals in response to said logical combination at the first and intermediate locations of the data and identifying information about the first entity;

transmitting the second encoded signal from the intermediate location to the first location; and comparing the second encoded signal received at the first location with the second encoded signal produced thereat to signal proper transmission and reception of the data and the encoded signal from the first to the intermediate location in response to detection of parity of compared second encoded signals.

15. The method according to claim 13 in which the steps of encoding at the intermediate and second locations include forming second auxiliary encoded signals in response to said logical combination at the intermediate and second locations of the data and identifying information about the second entity;

transmitting the second auxiliary encoded signal from the second location to the first intermediate location; and comparing the second auxiliary encoded signal received at the first intermediate location with the second auxiliary encoded signal produced thereat to signal proper transmission and reception of the data and the auxiliary encoded signal from the first intermediate to the second location in response to detection of parity of compared second auxiliary encoded signals.

16. The method according to claim 14 or 15 comprising the step of initiating the transmission to the first location of the second encoded signal in response to detection of parity in comparison of the second auxiliary encoded signal received at the intermediate location with the second auxiliary encoded signal produced thereat.

17. Apparatus for securing a transaction between first and second spaced locations using identification information provided at the second location, the apparatus comprising:

first and second encoding means at the first and second locations, respectively, each having a pair of inputs for encoding according to a logical combination of the signals applied to one input in accordance with signals applied to the other input to produce an encrypted signal at an output thereof;

means at the first location coupled to the inputs of the first encoding means for applying thereto signals representative of the identification information and the data pertaining to the transaction to produce the encrypted signal at the output of the first encoding means for transmission to the second location with the signals representative of data;

means at the second location for applying to the inputs of the second encoding means the signals representative of data received at the second location and the signals representative of the identification information provided at the second location to produce an encrypted signal at the output of the second encoding means;

comparator means at the second location coupled to receive the encrypted signal at the output of the second encoding means, and coupled to receive the transmitted encrypted signal received from the first encoding means for producing an output indication of the favorable comparison of said encrypted signals; and circuit means responsive to the output indication for producing a manifestation of said favorable comparison to indicate completion of the transaction.

18. Apparatus as in claim 17 wherein:

said first and second encoding means each produces a second encrypted signal from the signals applied to the inputs thereof;

19 said circuit means responsive to the output indication initiates transmission to the first location of the second encrypted signal from the second encoding means at the second location; and second comparator at the first location coupled to receive the second encrypted signal received from the second location and the second encrypted signal produced by the first encoding means to produce an output manifestation of parity of comparison between said second encrypted signals.

19. Apparatus according to claim 17 wherein:

said circuit means initiates transmission of the data pertaining to the transaction to a third location in response to said output indication;

a third encoding means at said third location for encoding signals applied thereto according to a logical combination, said third encoding means having inputs coupled to receive the signals representing data pertaining to the transaction transmitted thereto from the second location and signals representing auxiliary identification information provided at the third location for producing an auxiliary encrypted signal;

means for transmitting the auxiliary encrypted signal to the second location;

auxiliary encoding means at the second location for encoding signals applied thereto according to the logical combination as in the third encoding means, said auxiliary encoding means being coupled to receive the signals representing data pertaining to the transaction and signals representing auxiliary identification information provided at the second location to produce an auxiliary encrypted signal; and auxiliary comparator means at the second location coupled to receive the auxiliary encrypted signal produced thereat and the auxiliary encrypted signal received thereat from the third location for producing an output manifestation of completion of the transaction.

20. Apparatus as in claim 19 comprising means responsive to the output manifestation from said auxiliary comparator means for initiating the transmission to the third location of a signal for indicating completion of the transaction at the third location.

21. Apparatus as in claim 17 for introducing auxiliary identification information into the second location from the first location as the secured transaction, wherein:

said means connected to the encoding means at the first location applies to inputs thereof signals representative of the identification information, the auxiliary identification information and data pertaining to the transaction to produce at the output of the encoding means an auxiliary encrypted signal for transmission to the second location;

decoding means at the second location for decoding with respect to said logical combination of the first encoding means the received auxiliary encrypted signal and the signal representative of the data pertaining to the transaction to reproduce the auxiliary identification information;

source means of key coding signal;

auxiliary encoding means at the second location coupled to receive the key coding signal from the source means and the reproduced auxiliary identification information from the decoding means to produce an encrypted form of the auxiliary identification means in accordance with the key coding signal; and storage means at the second location for storing the encrypted auxiliary identification information and the key coding signal therefor.

22. Apparatus as in claim 21 comprising means responsive to the output indication from the comparator means for enabling the encryption of the auxiliary identification information by the auxiliary encoding means in response to favorable comparison in said comparator means.

23. Apparatus for securing a transaction between first and second spaced locations using identification information provided at the second location where the secured transaction is the alteration of signals representative of auxiliary identification information stored at the second location, the apparatus comprising:

first and second encoding means at the first and second locations, respectively, each having a pair of inputs for encoding according to a logical combination of the signals applied to one input in accordance with signals applied to the other input to produce an encrypted signal at an output thereof, said first encoding means producing an auxiliary encrypted signal from the signals applied thereto, and said second encoding means at the second location producing an auxiliary encrypted signal from signals applied thereto;

means at the first location coupled to the inputs of the first encoding means for applying thereto signals representative of the identification information, the auxiliary identification information, the auxiliary identification information in altered form, and the data pertaining to the transaction for encoding said signals in accordance with said logical combination to produce at the output of the first encoding means an encrypted signal, an auxiliary encrypted signal and an encrypted auxiliary identification information signal for transmission to the second location;

means at the second location for applying to the inputs of the second encoding means the signals representative of data received at the second location and the signals representative of the identification information provided at the second location to produce an encrypted signal at the output of the second encoding means;

decoding means at the second location for decoding with respect to said logical combination of the first encoding means the received auxiliary encrypted signal and the signal representative of the data pertaining to the transaction to reproduce the auxiliary identification information;

auxiliary decoding means at the second location coupled to receive the encrypted auxiliary identification information signal received thereat and the signal representative of the auxiliary identification information provided at the second location for decoding the same with respect to said logical combination to produce the altered auxiliary identification information signal;

comparator means at the second location coupled to receive the encrypted signal at the output of the second encoding means, coupled to receive the transmitted encrypted signal received from the first encoding means for producing an output indication of the favorable comparison of said encrypted signals, and coupled to compare the encrypted signals and auxiliary encrypted signals, respectively, received from the first location and produced at the second location;

source means of key coding signal;

auxiliary encoding means at the second location coupled to receive the key coding signal from the source means and the reproduced auxiliary identification information from the decoding means to produce an encrypted form of the auxiliary identification means in accordance with the key coding signal; and encryption means coupled to receive the altered auxiliary identification information for encryption thereof with a key coding signal from said source means.

24. Apparatus as in claim 23 wherein said comparator means at the second location is couled to receive said encrypted signals and auxiliary encrypted signals produced thereat and received thereat from the first location for enabling the decoding of the altered auxiliary identification information.

25. Apparatus for securing a transaction between two entities at first and second spaced locations using identification information about the two entities stored at an intermediate location, the apparatus comprising:

first and second encoding means at the first and intermediate locations, respectively, each for producing an encoded signal in accordance with a logical combination of signals applied to the inputs thereof;

means for applying to inputs of the first encoding means signals representative of the identification information about the one entity, and of the data pertaining to the transaction to produce an encoded signal at the output of said first encoding means for transmission to the intermediate location with the signals representative of the data pertaining to the transaction;

means for applying to inputs of the second encoding means the signals representative of the data pertaining to the transaction as received from the first location and signals representative of the identification information about the one entity stored at the intermediate location to produce an encoded signal at the output of said second encoding means;

first and second comparator means at the intermediate and second locations, respectively, for comparing encoded signals applied to the inputs thereof;

means coupled to the first comparator means for applying to the inputs thereof the encoded signal received from the first location and the encoded signal produced at the intermediate location;

third and fourth encoding means at the intermediate and second locations, respectively, each for producing an encoded signal in accordance with the logical combination of signals applied to the inputs thereof;

means responsive to the output of the first comparator means for enabling the encoding in the third encoding means of signals representative of the data pertaining to the transaction received from the first location and signals representative of identification information about the other of the two entities to produce an encoded signal at the output of the third encoding means for transmission to the second location with signals representative of the data pertaining to the transaction;

means at the second location for applying to inputs of the fourth encoding means signals representative of the data pertaining to the transaction as received from the intermediate location and signals representative of identification information about the other of the two entities provided at the second location for producing an encoded signal at the output of the fourth encoding means; and means at the second location for applying to the inputs of the second comparator the encoded signal received from the intermediate location and the encoded signal from the fourth encoding means for producing at the output of the second comparator means an output manifestation for completion of the transaction in response to favirable comparison of the encoded signals applied thereto.

26. Apparatus as in claim 25 for securing a transaction, wherein:

said first and second encoding means at the first and intermediate locations also produce second encoded signals as the logical combination of the signals representative of the data and of the identifying information applied to the inputs thereof;

means for transmitting the second encoded signal from the intermediate location to the first location; and third comparator means at the first location coupled to receive the second encoded signals received from the intermediate location and from the first encoding means for producing an output manifestation of the completed transmission to the intermediate location of signals representative of the data pertaining to the transaction.

27. Apparatus as in claim 25 for securing a transaction, wherein:

said third and fourth encoding means at the intermediate and second locations also produce second encoded signals as the logical combination of the signals representative of the data and of the identifying information applied to the inputs thereof;

means for transmitting the second encoded signal from the second location to the intermediate location; and auxiliary comparator means at the intermediate location coupled to receive the second encoded signals received from the second location and from the third encoding means for producing an output manifestation of the completed transmission to the second location of signals representative of the data pertaining to the transaction.

28. Apparatus as in claim 27 comprising:

means responsive to the output manifestation from the auxiliary comparator means for initiating transmission of the second encoded signal from the intermediate location to the first location; and third comparator means at the first location coupled to receive the second encoded signals from the intermediate location and from said first encoding means for producing an output manifestation of the completed transmission to the second location of signals representative of the data pertaining to the transaction.

* * * * *